US009238595B2

(12) United States Patent
Bouillon et al.

(10) Patent No.: US 9,238,595 B2
(45) Date of Patent: Jan. 19, 2016

(54) METHOD FOR SMOOTHING THE SURFACE OF A PART MADE FROM A CMC MATERIAL

(75) Inventors: Eric Bouillon, Le Haillan (FR); Nicolas Eberling-Fux, Talence (FR); Serge Chateigner, Pessac (FR)

(73) Assignees: HERAKLES, Le Haillan (FR); SNECMA, Paris (FR)

( * ) Notice: Subject to any disclaimer, the term of this patent is extended or adjusted under 35 U.S.C. 154(b) by 726 days.

(21) Appl. No.: 13/132,521

(22) PCT Filed: Dec. 2, 2009

(86) PCT No.: PCT/FR2009/052363
§ 371 (c)(1),
(2), (4) Date: Jul. 13, 2011

(87) PCT Pub. No.: WO2010/063946
PCT Pub. Date: Jun. 10, 2010

(65) Prior Publication Data
US 2011/0268577 A1 Nov. 3, 2011

(30) Foreign Application Priority Data
Dec. 4, 2008 (FR) ..................................... 08 58257

(51) Int. Cl.
B32B 9/04 (2006.01)
B32B 13/04 (2006.01)
B32B 15/04 (2006.01)
B32B 9/00 (2006.01)
C04B 41/52 (2006.01)
(Continued)

(52) U.S. Cl.
CPC ................ *C04B 41/52* (2013.01); *C04B 41/009* (2013.01); *C04B 41/90* (2013.01); *F01D 5/288* (2013.01); *C04B 2111/00344* (2013.01); *F05D 2230/90* (2013.01); *F05D 2300/21* (2013.01); *F05D 2300/603* (2013.01); *Y02T 50/672* (2013.01); *Y02T 50/673* (2013.01); *Y10T 428/31678* (2015.04)

(58) Field of Classification Search
CPC .... C04B 35/806; C04B 41/009; C04B 41/90; C04B 41/4535; C04B 41/4554; C04B 41/5059; C04B 41/515
USPC ........... 428/446, 457, 469; 416/241 B, 241 R
See application file for complete search history.

(56) References Cited

U.S. PATENT DOCUMENTS 5,246,736 A  9/1993 Goujard et al.
5,965,266 A  10/1999 Goujard et al.
(Continued)

FOREIGN PATENT DOCUMENTS

FR  2 401 888  3/1979
FR  2 850 649  8/2004

OTHER PUBLICATIONS

International Search Report as issued for PCT/FR2009/052363, published as WO2010/053946 on Jun. 2010.

*Primary Examiner* — Jonathan Langman
(74) *Attorney, Agent, or Firm* — Pillsbury Winthrop Shaw Pittman LLP

(57) ABSTRACT

A method of smoothing the surface of a ceramic matrix composite part presenting a surface that is undulating and rough. The method includes forming a ceramic coating on the surface of the part, the coating being made by applying a liquid composition on the surface of the part, the composition containing a ceramic-precursor polymer and a factory solid filler, curing the polymer, and transforming the cured polymer into ceramic by heat treatment. The method further includes impregnating the ceramic coating with a liquid metallic composition.

11 Claims, 5 Drawing Sheets

(51) Int. Cl.
  *C04B 41/00* (2006.01)
  *C04B 41/90* (2006.01)
  *F01D 5/28* (2006.01)
  *C04B 111/00* (2006.01)

(56) References Cited

U.S. PATENT DOCUMENTS

| | | | |
|---|---|---|---|
| 6,068,930 A | 5/2000 | Lamouroux et al. | |
| 6,110,535 A * | 8/2000 | Rey et al. | 427/383.3 |
| 6,245,424 B1 * | 6/2001 | Lau et al. | 428/368 |
| 6,291,058 B1 | 9/2001 | Goujard et al. | |
| 6,316,048 B1 * | 11/2001 | Steibel et al. | 427/180 |
| 2005/0077341 A1 * | 4/2005 | Larrieu et al. | 228/193 |
| 2006/0141154 A1 | 6/2006 | Thebault | |
| 2006/0169404 A1 * | 8/2006 | Thebault et al. | 156/307.3 |
| 2008/0113095 A1 * | 5/2008 | Gorman et al. | 427/226 |
| 2009/0220776 A1 * | 9/2009 | Meschter et al. | 428/335 |

* cited by examiner

METHOD FOR SMOOTHING THE SURFACE OF A PART MADE FROM A CMC MATERIAL

CROSS REFERENCE TO RELATED APPLICATIONS

This application is the U.S. National Stage of PCT/FR2009/052363 filed Dec. 2, 2009, which in turn claims priority to French Application No. 0858257, filed Dec. 4, 2008. The contents of both applications are incorporated herein reference in their entirety.

BACKGROUND OF THE INVENTION

The present invention relates to ceramic matrix composite material parts. More particularly, it relates to improving the surface state of such parts.

In aeroengines, and in particular in the gas turbines or turbomachines of such engines, parts that present aerodynamic shapes, such as blades, are usually made of metal alloys using a method of casting and local machining. Present and future requirements concerning reducing specific fuel consumption, diminishing pollution, etc, in aeroengines are leading to a significant increase in their weight, and in particular in the low-pressure stages of the turbines.

Blades constitute an important portion of the weight of low-pressure stages. In order to significantly reduce weight and accommodate operating temperatures higher than those possible with present-day metal alloys, one solution would be to use ceramic matrix composite materials for making blades.

Ceramic matrix composite (CMC) materials are particular so-called "thermostructural" composite materials, i.e. composite materials having good mechanical properties and the ability to conserve those properties at high temperature. Furthermore, parts, such as blades, that are made of CMC present a significant weight saving compared with the same parts made using the usual metal alloys.

In well-known manner, CMC parts are formed by fiber reinforcement made of refractory fibers (carbon fibers or ceramic fibers), which reinforcement is densified by a ceramic matrix, in particular a matrix of carbide, nitride, refractory oxide, . . . Typical examples of CMC materials are C—SiC materials (carbon fiber reinforcement and silicon carbide matrix), SiC—SiC materials, and C—C/SiC materials (matrix comprising a mixture of carbon and silicon carbide). The fabrication of CMC composite parts is well-known. The fiber reinforcement may be densified using a liquid technique (impregnation with a ceramic matrix precursor resin and transformation of the resin into ceramic by curing and pyrolysis, which process may be repeated), or by a gas technique (chemical vapor infiltration).

Nevertheless, CMC parts present a surface appearance that is undulating and relatively rough, which may be found to be incompatible with the aerodynamic performance required of parts such as blades. Surface undulations are due to the fiber reinforcement, whereas roughness is associated with the "seal-coat" ceramic matrix, in particular when the matrix is deposited by chemical vapor infiltration (CVI).

Conversely, parts made of metal alloys and the associated methods present a surface aspect that is smooth, with roughness that is very small (of the order of 1 micrometer ($\mu m$)).

One solution for improving the surface state of a CMC part consists in applying a liquid composition to the surface of the part, the composition containing a ceramic-precursor polymer, e.g. a precursor of silicon carbide, together with a refractory solid filler in the form of grains serving to form a ceramic coating. The ceramic coating serves to level out the undulations present at the surface of the part. That step is followed by depositing a ceramic, e.g. SiC, performed by chemical vapor infiltration for a duration of about 30 hours (h) approximately, thereby bonding together the grains of the refractory filler. Such a surface treatment method for a CMC part is described in document US 2006/0141154.

Although that method makes it possible significantly to improve the surface state of a CMC part by eliminating the undulations and by reducing surface roughness to values of less than 40 $\mu m$, the need for additional chemical vapor infiltration after the ceramic coating has been formed gives rise to considerable increases in the cost of the part and in the time taken to fabricate it.

OBJECT AND SUMMARY OF THE INVENTION

An object of the present invention is to propose a method of obtaining CMC parts with a controlled surface state, but that does not present the above-mentioned drawback, and in particular a method of obtaining parts with a surface state that is compatible with applications that require aerodynamic performance.

To this end, the invention proposes a method of smoothing the surface of a part made of ceramic matrix composite material presenting a surface that is undulating and rough, the method comprising forming a ceramic coating on the surface of the part, the coating being made by applying a liquid composition to the surface of the part, the composition containing a ceramic-precursor polymer and a refractory solid filler, curing the polymer, and transforming the cured polymer into ceramic by heat treatment, in which method, in accordance with the invention, the ceramic coating is impregnated with a liquid metallic composition.

Thus, by impregnating the ceramic coating with a liquid metallic composition, the method makes it possible significantly to improve the surface state of the CMC part, and to do so with treatment that is much faster and less expensive than chemical vapor infiltration. Impregnation with the metallic composition also makes it possible to stabilize and reinforce the ceramic coating by binding together the grains of the solid filler and/or the particles of the ceramic coating.

The present invention also provides a CMC part with its surface state improved in accordance with the method of the invention, the CMC part also being provided with a ceramic coating comprising a ceramic phase and a solid filler, a metallic composition also being present on the accessible surface of the ceramic coating.

The part may in particular be a blade for a turbomachine.

BRIEF DESCRIPTION OF THE DRAWINGS

Other characteristics and advantages invention appear from the following description of particular implementations of the invention, given as a nonlimiting examples, and with reference to the accompanying drawings, in which.

DETAILED DESCRIPTION OF IMPLEMENTATIONS

Figure 1:
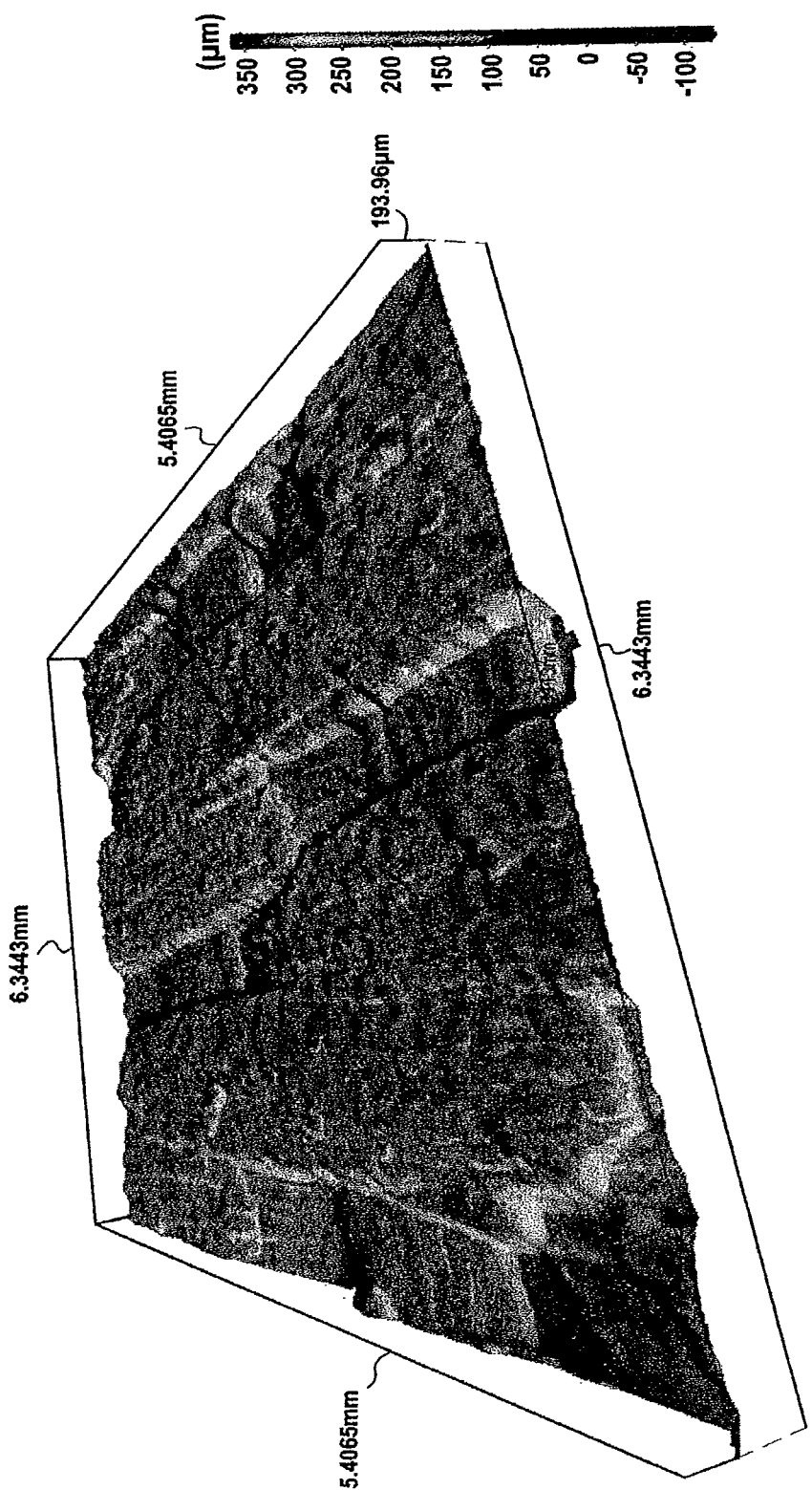
FIG. 1 is a three-dimensional view showing the surface state of a portion of a CMC part without additional surface treatment.

The present invention provides a method of smoothing the surface of a ceramic matrix composite (CMC) part presenting a surface that is undulating and rough.

The fabrication of a CMC part begins by providing a fiber structure from which a fiber preform is formed so as to have a shape that is close to the shape of the part that is to be fabricated.

The fiber structure may be in various forms, such as:
- a two-dimensional (2D) fabric;
- a three-dimensional (3D) fabric obtained by 3D weaving or by multiple layer weaving;
- a braid;
- a knit;
- a felt; and
- a unidirectional (UD) sheet of yarns or tows or multidirectional (nD) sheets obtained by superposing a plurality of UD sheets in differing directions and bonding the UD sheets together, e.g. by stitching, by a chemical bonding agent, or by needling.

It is also possible to use a fiber structure made up of a plurality of superposed layers of woven fabric, braid, knit, felt, sheets, etc., which layers are bonded together, e.g. by stitching, by implanting yarns or rigid elements, or by needling.

The fibers constituting the fiber structure are refractory fibers, i.e. ceramic fibers, e.g. silicon carbide (SiC) fibers in particular such as Nicalon® SiC fibers from the supplier Nippon Carbon Co. Ltd., or Sylramic® SiC fibers from the supplier COI Ceramics Inc., carbon fibers, or indeed fibers of a refractory oxide, e.g. of alumina ($Al_2O_3$).

Once constituted, the fiber texture is consolidated by being impregnated with a liquid composition containing a ceramic-precursor consolidation resin. For this purpose, the fiber texture is immersed in a bath containing the resin and usually a solvent for the resin. After draining, drying is performed in a stove. Drying may be accompanied by pre-curing or partial curing of the resin. Since such pre-curing provides additional stiffness, when it is performed, it must be limited in order to preserve sufficient deformability for the fiber texture on which the first interphase layer has already been formed.

Other known impregnation techniques may be used, such as preparing a pre-impregnated texture by passing the fiber texture continuously through an impregnator, infusion impregnation, or indeed impregnation by resin transfer molding (RTM).

The consolidation resin is selected so that after pyrolysis, it leaves a ceramic residue that is sufficient to provide consolidation of the fiber preform that is made subsequently.

By way of example, a ceramic-precursor resin may be a polycarbosilane resin that is a precursor of silicon carbide (SiC), or a polysiloxane resin that is a precursor of SiCO, or a polyborocarbosiloxane resin that is a precursor of SiCNB, or indeed a polysilazane resin that is a precursor of SiCN.

After impregnation, a fiber preform for constituting the fiber reinforcement of the part that is to be made, and having a shape that corresponds substantially to the shape of said part, is shaped by shaping the fiber texture using supporting tooling.

The shaping of the fiber preform is preferably accompanied by compacting the fiber structure so as to increase the volume ratio of the fibers in the composite material of the part that is to be made.

After the preform has been shaped, the resin is cured, or curing is completed if there has been pre-curing, with the preform being held in tooling.

Thereafter, consolidation is completed by heat treatment for pyrolyzing the resin. Pyrolysis is performed at a temperature lying in the range 900° C. to 1000° C. approximately, for example.

Consolidation may also be performed by chemical vapor infiltration (CVI).

After this consolidation, densification of the fiber preform with a ceramic matrix is continued.

Densification is advantageously performed by chemical vapor infiltration (CVI), the parameters of the CVI process and the nature of the reaction gas being adapted to the nature of the matrix that is to be formed. It is thus possible to perform the operations of pyrolyzing the consolidation resin and of densification one after the other in the same oven.

The ceramic matrix formed by CVI may be an SiC matrix, a matrix based on silicon such as silicon nitride ($Si_3N_4$), or a matrix that is at least in part self-healing, such as a silicon-boron-carbon (Si—B—C) matrix, or a boron carbide ($B_4C$) matrix, or indeed a sequenced matrix having alternating matrix phases of non-healing ceramic and of healing ceramic. Reference may be made in particular to the following documents: FR 2 401 888; U.S. Pat. Nos. 5,246,736; 5,965,266; 6,068,930; and 6,291,058.

The ceramic matrix may be deposited in a plurality of successive infiltration cycles, with a machining operation between each cycle serving to re-open the pores of the material at the surface and facilitate deposition of the matrix within the fiber reinforcement.

Figure 2:
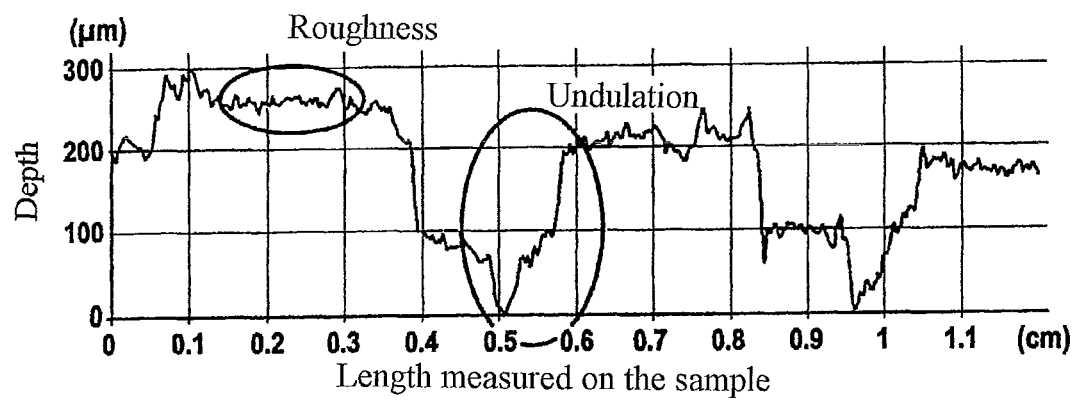
FIG. 2 is a curve showing measured dimensional variations in the FIG. 1 part portion.

FIG. 1 shows the surface state of a portion of a CMC part made from a consolidated multilayer fiber texture of three-dimensionally woven SiC fibers Guipex®, 8 harnesssatin weave), shaped and densified using the above-described method. As measured in FIG. 2, the part presents a surface having both undulations with an attitude of more than 200 μm and roughness at a level of several tens of micrometers.

Figure 3:
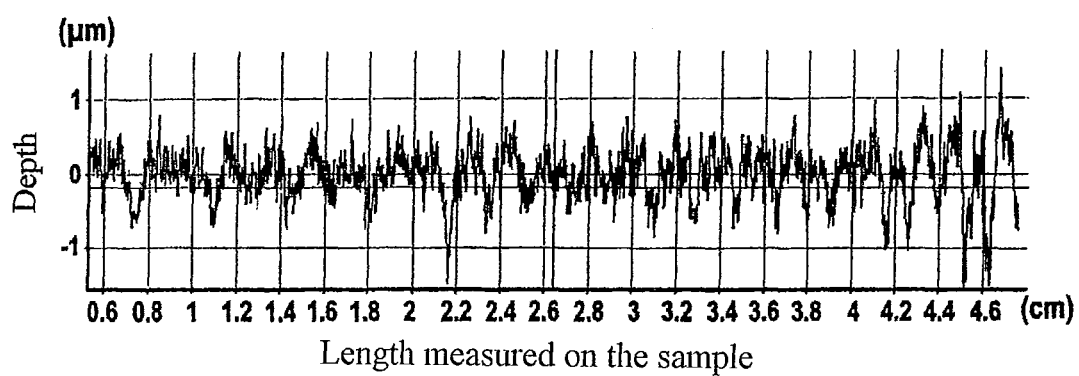
FIG. 3 is a curve showing measured dimensional variations in the surface of a metallic material used for making blades in an aeroengine.

As explained above, such surface irregularity means that it is unlikely that such a part can be used for dynamic applications. For comparison, FIG. 3 shows a measurement of the surface state of a blade of a low-pressure stage of an aeroengine, the blade being made of a metallic material. It can be seen that the blade does not have any surface undulations and that it presents a mean level of roughness of the order of 1 μm.

Figure 4:
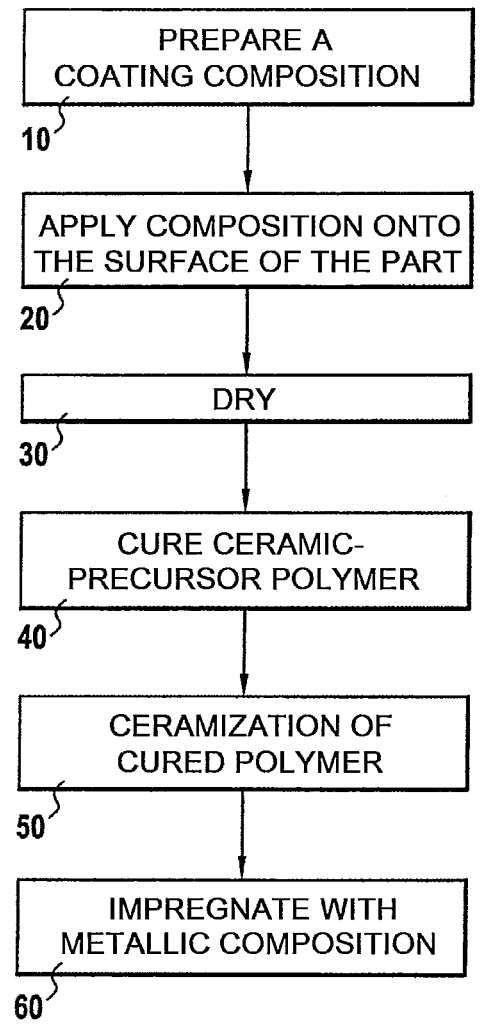
FIG. 4 is a flowchart showing successive steps in an implementation of a method in accordance with the invention.

With reference to FIG. 4, an implementation of a method according to the invention for smoothing the surface of a CMC part comprises the following steps.

A ceramic coating composition is prepared (step 10) the composition comprising a refractory solid filler in powder form, in particular in ceramic form, a ceramic-precursor polymer, and optionally a solvent for the polymer.

By way of example, the powder is an SiC powder. The grain size is selected to be sufficiently fine to enable the grains of powder to penetrate into the surface pores that need to be filled in the CMC composite material. Preferably, the mean size of the grains is selected to be smaller than 100 μm, for example lying in the range 5 μm to 50 μm. It is also possible to use powders of different grain sizes. For example, it is possible to use grains having a mean size lying in the range 5 μm to 15 μm in association with grains having a mean size lying in the range 25 μm to 50 μm, the proportion by weight of the grains of larger mean size being for example not less than the proportion by weight of the grains of smaller mean size.

It is also possible to use other powders, in particular ceramic powders and having substantially the same grain size. By way of example, they may be selected from carbide powders (other than SiC), nitride powders, or boride powders, it being possible to mix powders of different kinds.

The ceramic-precursor polymer is selected as a function of the nature of the desired coating. With an SiC coating, the polymer may be selected for example from polycarbosilane (PCS) and polytitanocarbosilane (PTCS).

Other ceramic-precursor polymers may be used, for example silicones that are precursors of SiC (or SiC+C, with excess carbon), polysilazanes that, pyrolyzed under a gas, serve to obtain residues based on $Si_3N_4$ and/or on SiC, and polyborazines, precursors of BN.

It should be observed that the ceramic constituting the solid filler and the ceramic for which the polymer is a precursor are preferably, but not necessarily, of the same kind.

The solvent is determined as a function of the ceramic-precursor polymer that is used. For example, with PCS, the solvent may be xylene. Other solvents can be used for other polymers, for example heptane, hexane, methylethylketone (MEK), or ethanol for silicones.

The quantity of solid filler, compared with the quantity of ceramic-precursor polymer, is selected to ensure that the surface pores of the thermostructural composite material are filled in satisfactory manner, while still allowing the composition to penetrate to a certain depth. Thus, the quantity of solid filler by weight preferably lies in the range approximately 0.4 times to 4 times the quantity by weight of ceramic-precursor polymer. This range also makes it possible to adjust the shrinkage ratio of the ceramic-precursor polymer during its transformation.

The quantity of solvent used is selected to confer suitable viscosity on the liquid composition in order to enable it to be applied to the surface of the part.

By way of example, a typical composition for a composition that is to form an SiC coating may be selected within the following ranges:

SiC powder (mean grain size lying in the range 5 µm to 50 µm): 2 parts by weight (pbw) to 7 pbw;
PCS (SiC precursor): 1 pbw to 3 pbw; and
xylene (PCS solvent): 2 pbw to 5 pbw.

The liquid composition is applied to the surface of the part that is to be treated (step 20).

The application may be performed merely by using a brush or a paintbrush. Other methods could be used, for example a paint gun.

After drying (step 30), e.g. using hot air, for the purpose of eliminating the solvent, the ceramic-precursor polymer is cured (step 40). The curing may be performed by heat treatment. By way of example, with PCS, the temperature is raised progressively up to a plateau at about 350° C.

The cured polymer is subjected to heat treatment for ceramization purposes (step 50). For PCS, transformation to SiC is performed by raising its temperature progressively up to a plateau at about 900° C.

Several successive layers of liquid composition may be applied. After each layer has been applied, it is preferable at least to dry the composition and to cure the ceramic-precursor polymer. The ceramization may be performed simultaneously for all of the layers.

Naturally, curing and ceramization conditions may be different using other ceramic precursors, these conditions not being original in any way.

The ceramic coating is then obtained comprising a phase derived from ceramization of the ceramic precursor and a solid filler. This coating fills the undulations and the recesses in the surface of the part.

Nevertheless, the ceramic coating as formed in this way needs to be stabilized structurally. In particular, it is necessary to ensure bonding between the solid filler grains because of the shrinkage of the ceramic-precursor resin while it is being transformed. During the heat treatment for ceramization purposes, the material of the ceramic precursor shrinks, thereby cracking and crumbling the ceramic. The grains are then no longer all bonded to one another within a continuous ceramic block.

For this purpose, and in accordance with an implementation of the invention, the accessible surface of the ceramic coating is impregnated with a liquid metallic composition (step 60). The term "accessible surface" is used to mean the generally external surface of the ceramic coating, and also the internal surface of the coating that has external access, i.e. the surface that is made accessible from the outside after shrinkage during ceramization heat treatment (access to this internal surface being via cracks that open to the outside).

As described below in detail, it is this accessible surface that is impregnated with the liquid metallic composition so as to stabilize the ceramic coating (bond the grains together) and form, on its surface, a layer that presents a smooth surface state.

A metallic composition is selected that is thermally compatible, i.e. a composition having a coefficient of thermal expansion that is close to that of material of the parts, preferably lying in the range $4 \times 10^{-6}/°$ C. to $5 \times 10^{-6}/°$ C. (the CMC material having a coefficient of thermal expansion lying in the range $4 \times 10^{-6}/°$ C. to $4.5 \times 10^{-6}/°$ C., approximately). The metallic composition is also selected to be chemically compatible with the CMC material of the part. In addition, the metallic composition preferably presents a melting temperature that is lower than the stability temperature of the CMC material, and in particular the stability temperature of the fibers of the material (where the stability temperature is the temperature beyond which the mechanical characteristics of a material begin to degrade).

Figure 5:
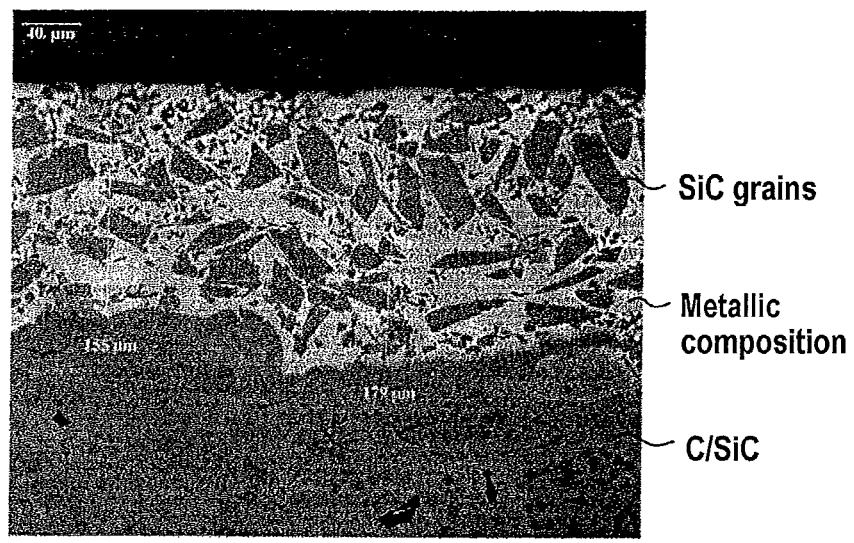
FIG. 5 is a micrograph showing a CMC material obtained in accordance with a method of the invention.

By way of example, a C/SiC composite material part (a part having carbon fiber reinforcement and an SiC matrix) and carrying a ceramic coating of the type described above, may be impregnated with a silicon-germanium composition containing, in percentages by weight, 90% germanium and 10% silicon. This composition presents a melting temperature of about 1150° C. FIG. 5 shows the surface coating as obtained in this way.

Another example of a metallic composition that may be used is a silicon-nickel composition comprising, in percentages by weight, 50% silicon and 50% nickel. This composition has a melting temperature of about 1100° C.

For a part in which the SiC fibers of the fiber reinforcement present a stability temperature that is lower than or close to the melting temperature of the metallic composition that is used, the duration of the heat treatment that is applied for melting the metallic composition and for impregnating the ceramic coating should be limited. By way of example, a part made of Cerasep®, i.e. an SiC/SiC composite (reinforcing fibers and matrix both made of SiC), contains Nicalon® fibers that are thermostable up to about 1100° C. Under such circumstances, if use is made, for example, of a metallic composition containing an alloy of silicon and germanium (SiGe) that presents a melting temperature of about 1150° C., then the duration of the heat treatment at this temperature should be no more than 30 minutes (min). For heat treatment performed at 1250° C., then the duration should be limited to 20 min.

The layer of metallic composition is formed in such a manner as to compensate for the surface irregularities on the ceramic coating, with the quantity of metallic composition being selected as a function of the irregularities to be compensated. The layer formed in this way serves to smooth the surface of the ceramic coating, and consequently the surface of the part.

By infiltrating the ceramic coating, impregnation with a metallic composition also serves to bond together the grains and/or particles of the coating. Such impregnation also serves to increase the wear strength of the CMC part (under conditions of uniform friction).

Figure 6:
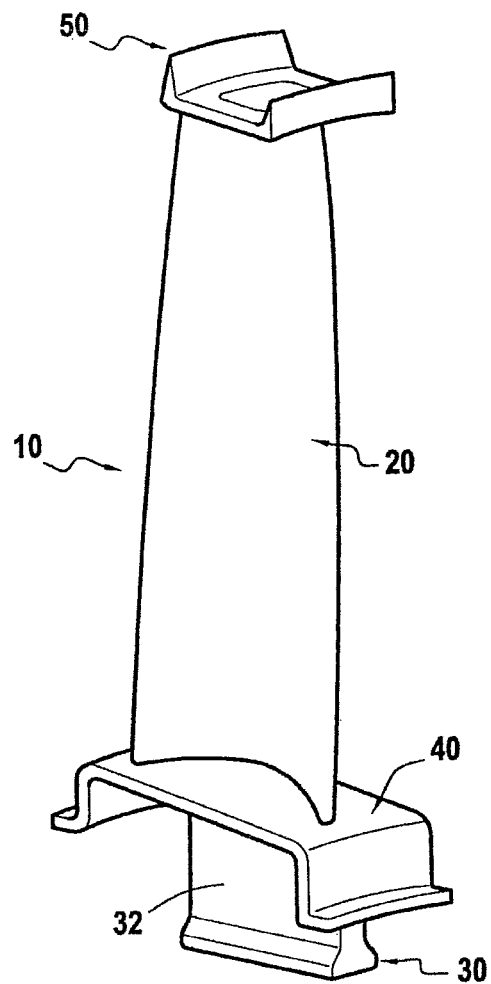
FIG. 6 is a perspective view of a turbomachine blade.

The invention is applicable to various types of turbomachine blade, in particular compressor blades and turbine blades of different gas turbine spools, for example a rotor blade of a low pressure (LP) turbine, such as that shown in FIG. 6.

In well-known manner, the blade 10 of FIG. 6 comprises an airfoil 20, a root 30 formed by a portion of greater thickness, e.g. presenting a bulb-shaped section, extended by a tang 32, an inner platform 40 situated between the tang 32 and the airfoil 20, and an outer platform 50 in the vicinity of the free end of the blade.

The invention claimed is:

1. A part made of thermostructural composite material comprising refractory fiber reinforcement densified by a ceramic matrix, the part also being provided with a ceramic coating comprising a ceramic phase and grains of a solid filler in powder form, the part further comprising a layer of metallic composition formed on an accessible surface of said ceramic coating, the metallic composition binding together the grains of the solid filler and/or particles of the ceramic coating and the layer of metallic composition forming on the accessible surface of the ceramic coating a layer that presents a smooth surface state, the metallic composition being retained in the ceramic coating and the metallic composition being made of a material that is different from that of the rains of the solid filler.

2. A part according to claim 1, constituting a gas turbine blade.

3. A turbomachine fitted with a blade according to claim 2.

4. A part according to claim 1, wherein the part comprises carbon fiber reinforcement densified by a matrix of silicon carbide.

5. A part according to claim 1, wherein the part comprises carbon fiber reinforcement densified by a silicon-based matrix.

6. A part according to claim 1, wherein the part comprises silicon carbide fiber reinforcement densified by a silicon carbide matrix, and wherein the metallic composition is based on silicon-germanium alloy.

7. A part according to claim 1, wherein the part comprises silicon carbide fiber reinforcement densified by a silicon carbide matrix, and wherein the metallic composition is based on silicon-nickel alloy.

8. A part comprising:
   a densified component made of a thermostructural composite material consisting of a refractory fiber reinforcement densified by a ceramic matrix, and
   a ceramic coating arranged on an external surface of the densified component, the ceramic coating comprising a ceramic phase and grains of a solid filler in powder form, wherein a layer of metallic composition is formed on an accessible surface of said ceramic coating, the metallic composition binding together the grains of the solid filler and/or particles of the ceramic coating and the layer of metallic composition forming on the accessible surface of the ceramic coating a layer that presents a smooth surface state, the metallic composition being made of a material that is different from that of the grains of the solid filler.

9. The part according to claim 8, wherein the metallic composition is retained in the ceramic coating.

10. The part according to claim 8, wherein the part constitutes a gas turbine blade.

11. A part made of thermostructural composite material comprising refractory fiber reinforcement densified by a ceramic matrix, the part also being provided with a ceramic coating comprising a ceramic phase and grains of a solid filler, the part further comprising a layer of metallic composition formed on an accessible surface of said ceramic coating, the metallic composition binding together the grains of the solid filler and/or particles of the ceramic coating and the layer of metallic composition forming on the accessible surface of the ceramic coating a layer that presents a smooth surface state, the metallic composition being retained in the ceramic coating, wherein the metallic composition is based on silicon-germanium alloy or on silicon-nickel alloy.

* * * * *